(12) United States Patent
Yoshida (10) Patent No.: US 9,061,378 B2
(45) Date of Patent: Jun. 23, 2015

(54) LENS ARRAY, LIGHT SOURCE DEVICE, PROJECTOR AND LIGHT SOURCE DEVICE FABRICATION METHOD

(75) Inventor: Kaoru Yoshida, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 302 days.

(21) Appl. No.: 13/607,258

(22) Filed: Sep. 7, 2012

(65) Prior Publication Data

US 2013/0057834 A1  Mar. 7, 2013

(30) Foreign Application Priority Data

Sep. 7, 2011  (JP) .................................. 2011-194524

(51) Int. Cl.
| | |
|---|---|
| G03B 21/14 | (2006.01) |
| B23P 11/00 | (2006.01) |
| F21V 5/04 | (2006.01) |
| G02B 27/12 | (2006.01) |
| G02B 3/00 | (2006.01) |
| G02B 27/10 | (2006.01) |
| G02B 27/14 | (2006.01) |
| G03B 21/20 | (2006.01) |
| F21V 7/00 | (2006.01) |

(52) U.S. Cl.
CPC ............ *B23P 11/00* (2013.01); *Y10T 29/49826* (2015.01); *F21V 5/04* (2013.01); *G02B 27/12* (2013.01); *G02B 3/0075* (2013.01); *G02B 27/1033* (2013.01); *G02B 27/141* (2013.01); *G03B 21/2013* (2013.01); *G03B 21/2033* (2013.01); *F21V 7/0083* (2013.01)

(58) Field of Classification Search
CPC ........... G02B 27/0961; G02B 27/0922; G02B 7/021; G03B 21/2033
USPC .............................................. 359/819; 353/38
See application file for complete search history.

(56) References Cited

U.S. PATENT DOCUMENTS

| | | | |
|---|---|---|---|
| 5,412,509 A * | 5/1995 | Nakata et al. ................. 359/811 |
| 7,192,147 B2 | 3/2007 | Sakata et al. | |
| 8,157,398 B2 | 4/2012 | Yamamoto | |
| 2006/0072199 A1* | 4/2006 | Morishita et al. ............. 359/542 |

(Continued)

FOREIGN PATENT DOCUMENTS

| | | |
|---|---|---|
| CN | 1487356 A | 4/2004 |
| CN | 201434259 Y | 3/2010 |

(Continued)

OTHER PUBLICATIONS

Taiwanese Office Action dated Jun. 12, 2014 in counterpart Taiwanese Application No. 101132644.

*Primary Examiner* — Sultan Chowdhury
*Assistant Examiner* — Danell L Owens
(74) *Attorney, Agent, or Firm* — Holtz, Holtz, Goodman & Chick PC (57) ABSTRACT

A lens array which facilitates the alignment of optical axes of light source elements with optical axes of lenses, a light source device that employs this lens array, a projector that employs this light source device and a light source device fabrication method are provided. A lens array 73 is an integrated assembly of a plurality of lens portions 73b which collect individually light from a plurality of light source elements and has cylindrical portions 73c for positioning the plurality of light source elements on a light entrance side of the individual lens portions 73b.

19 Claims, 8 Drawing Sheets

(56) References Cited

U.S. PATENT DOCUMENTS

2006/0139918 A1* 6/2006 Dolgin et al. ................. 362/232
2007/0121310 A1   5/2007 Sakata et al.
2008/0030974 A1* 2/2008 Abu-Ageel .................... 362/19

FOREIGN PATENT DOCUMENTS

| JP | 05-088062 | 4/1993 |
| TW | M372927 U | 1/2010 |
| TW | 201043842 A | 12/2010 |

* cited by examiner

LENS ARRAY, LIGHT SOURCE DEVICE, PROJECTOR AND LIGHT SOURCE DEVICE FABRICATION METHOD

CROSS-REFERENCE TO RELATED APPLICATION

This application is based upon and claims the benefit of priority under 35 USC 119 of Japanese Patent Application No. 2011-194524 filed on Sep. 7, 2011, the entire disclosure of which is incorporated herein by reference.

BACKGROUND OF THE INVENTION

1. Field of the Invention

The present invention relates to a lens array, a light source device that employs the lens array, a projector that employs the light source device, and a fabrication method of the light source device.

2. Description of the Related Art

In these days, data projectors are used on many occasions as image projection units which project images including images of a screen of a personal computer and video images, as well as images based on image data which are stored in a memory card on to a screen. In these projectors, light emitted from a light source is collected on to a micromirror display element called a digital micromirror device (DMD) or a liquid crystal panel for projection of color images on to a screen.

Additionally, in association with propagation of personal computers and video equipment such as DVD players, such projectors have been finding a variety of applications from commercial presentations to domestic use.

Conventionally, the mainstream of these projectors has been those which utilize a high-intensity discharge lamp as a light source. In recent years, however, there have been made many developments and proposals on light source devices which use a plurality of semiconductor light emitting elements such as laser diodes together with associated optical components such as pluralities of lenses and mirrors.

Then, Japanese Unexamined Patent Application No. 05-88062 (JP-A-05-88062) proposes a light source device that has a low-cost and simply configured lens array position adjusting mechanism which enables the accurate positioning of a lens array and a light emitting element array independently of the accurate mounting of those arrays at the time of fabrication of the light source device.

However, in the light source device proposed by JP-A-05-88062, the adjustment of optical axes of lenses and light emitting elements needs to be implemented by adjustment screws, and therefore, a certain length of time has had to be spent in performing the adjusting work.

BRIEF SUMMARY OF THE INVENTION

The invention has been made in view of the aforesaid problem which is inherent in the related art, and an object of the invention is to provide a lens array which facilitates the alignment of optical axes of light source elements with optical axes of lenses, a light source device that employs the lens array, a projector that employs the light source device, and a light source fabrication method.

With a view to attaining the object, according to a first aspect of the invention, there is provided a lens array that is an assembly of a plurality of lenses which collect individually light emitted from a plurality of light source elements, wherein each of the plurality of lenses has, on a light entrance side thereof, a cylindrical portion for positioning each of the plurality of light source elements.

According to a second aspect of the invention, there is provided a light source device comprising:

a plurality of light source elements;

a lens array having a plurality of lenses which include positioning cylindrical portions which correspond to the plurality of light source elements on a light entrance side thereof; and a plurality of cylindrical holders that are disposed between the plurality of light source elements and the lens array and which each have a first cylindrical portion having as an inner surface thereof a first straight cylindrical surface which fits on the cylindrical portion and a second cylindrical portion having as an inner surface thereof a second straight cylindrical surface which fits on part of an outer circumferential side surface of the light source element.

According to a third aspect of the invention, there is provided a projector comprising:

the light source device of the invention;

a display element;

a light source side optical system for guiding light from the light source device to the display element;

a projection side optical system for projecting an image emitted from the display element on to a screen; and a projector control unit for controlling the light source device and the display element.

According to a fourth aspect of the invention, there is provided a light source device fabrication method comprising:

a preparation process of preparing:

a plurality of light source elements;

a lens array having a plurality of lenses which include positioning cylindrical portions which correspond to the plurality of light source elements on a light entrance side thereof;

a plurality of cylindrical holders (a) that are disposed between the plurality of light source elements and the lens array and (b) which each have a first cylindrical portion having as an inner surface thereof a first straight cylindrical surface which fits on the cylindrical portion and a second cylindrical portion having as an inner surface thereof a second straight cylindrical surface which fits on part of an outer circumferential side surface of the light source element a lens array holder that has hole portions and which holds the lens array at a front side thereof;

a rear holder which presses the light source elements from the rear thereof; and a fastening plate which fastens the lens array to the lens array holder;

a fixing process of disposing the lens array holder outwards of a circumferential edge of the lens array and fixing the lens array to the lens array holder by the fastening plate;

a first disposing process of disposing the plurality of cylindrical holders in the hole portions in the lens array holder and disposing the cylindrical holders on the cylindrical portions of the lens array;

a second disposing process of disposing the plurality of light source elements individually in the plurality of cylindrical holders so disposed; and a third disposing process of disposing the rear holder so that lead terminals of the light source elements are inserted through the rear holder after the plurality of light source elements have been disposed in the plurality of cylindrical holders.

DETAILED DESCRIPTION OF THE PREFERRED EMBODIMENT

Hereinafter, am embodiment of the invention will be described by reference to the drawings.

Figure 1:
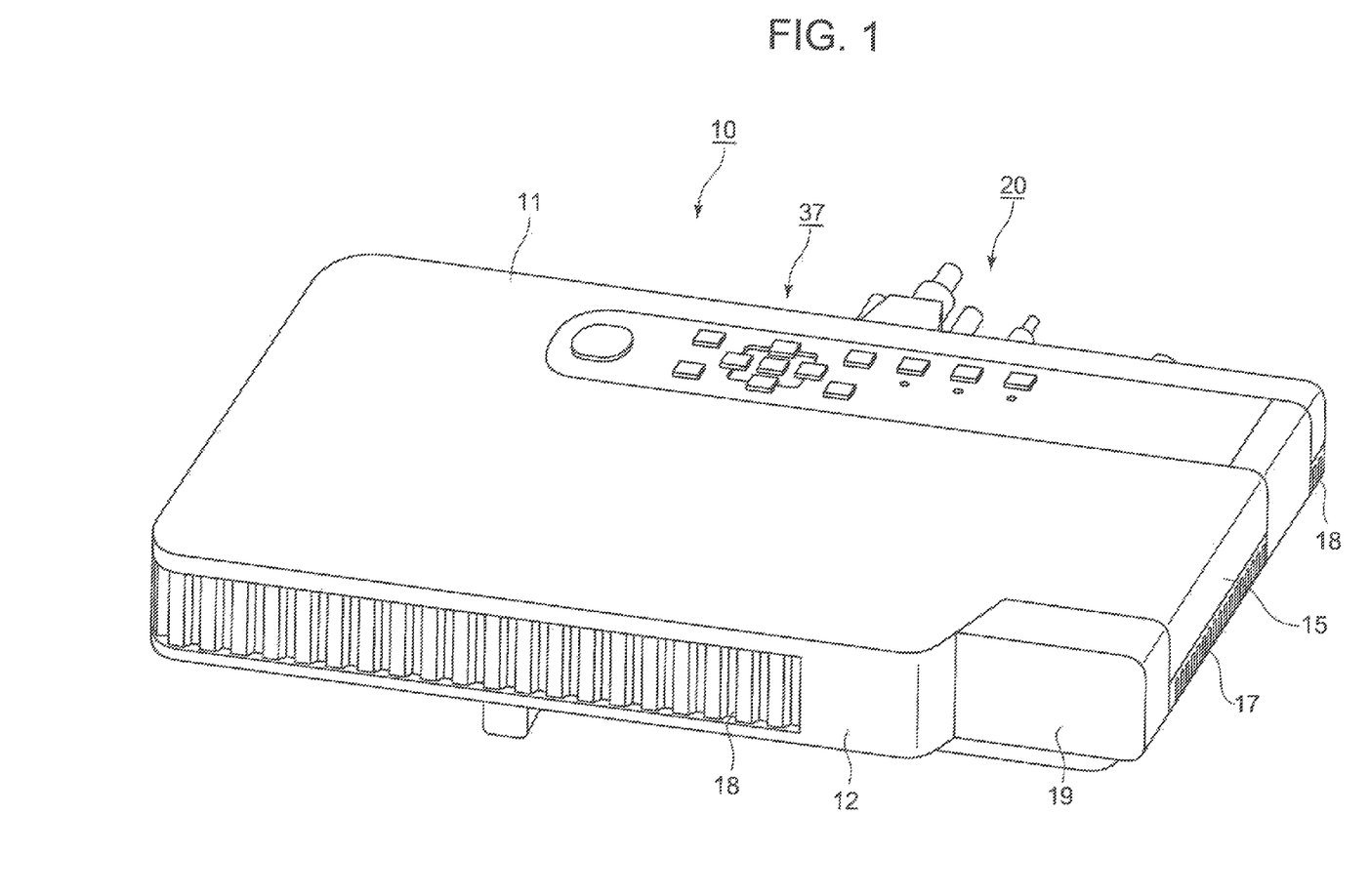
FIG. 1 is a perspective view showing an external appearance of a projector according to an embodiment of the invention.

FIG. 1 is a perspective view showing an external appearance of a projector 10.

It should be noted that when referred to with respect to the projector 10 in this embodiment, left and right denote, respectively, left and right directions with respect to a projecting direction, and front and rear denote, respectively, front and rear directions with respect to a direction towards a screen and a traveling direction of a pencil of light.

Additionally, as shown in FIG. 1, the projector 10 has a substantially rectangular parallelepiped shape and has a lens cover 19 which covers a projection opening which is laid to a side of a front side panel 12 which is referred to as a front side panel of a projector casing. Additionally, a plurality of outside air inlet ports 18 are formed in the front side panel 12.

Further, although not shown, the projector 10 includes an Ir reception unit which receives a control signal from a remote controller.

In addition, a keys/indicators unit 37 is provided on an upper side panel 11 of the projector casing. Disposed on this keys/indicators unit 37 are keys and indicators which include a power supply switch key, a power indicator which informs whether the power supply is on or off, a projection switch key which switches on or off the projection by the projector, and an overheat indicator which informs of an overheat condition when a light source unit, a display element, a control circuit or the like overheats.

Further, provided on a back side or a back side panel of the projector casing are an input/output connector unit where USB terminals, a video signal input D-SUB terminal into which an analog RGB video signal is inputted, an S terminal, an RCA terminal, an audio output terminal and the like are provided and various types of terminals 20 including a power supply adaptor plug.

Additionally, a plurality of outside air inlet ports are formed in the back side panel. In addition, pluralities of inside air outlet ports 17 are formed in a right side panel which is a lateral side panel of the projector casing which is not shown and a left side panel 15 which is a lateral side panel shown in FIG. 1. Further, outside air inlet ports 18 are also formed in a position on the left side panel 15 which lies near a corner portion between the left side panel 15 and the back side panel.

Figure 2:
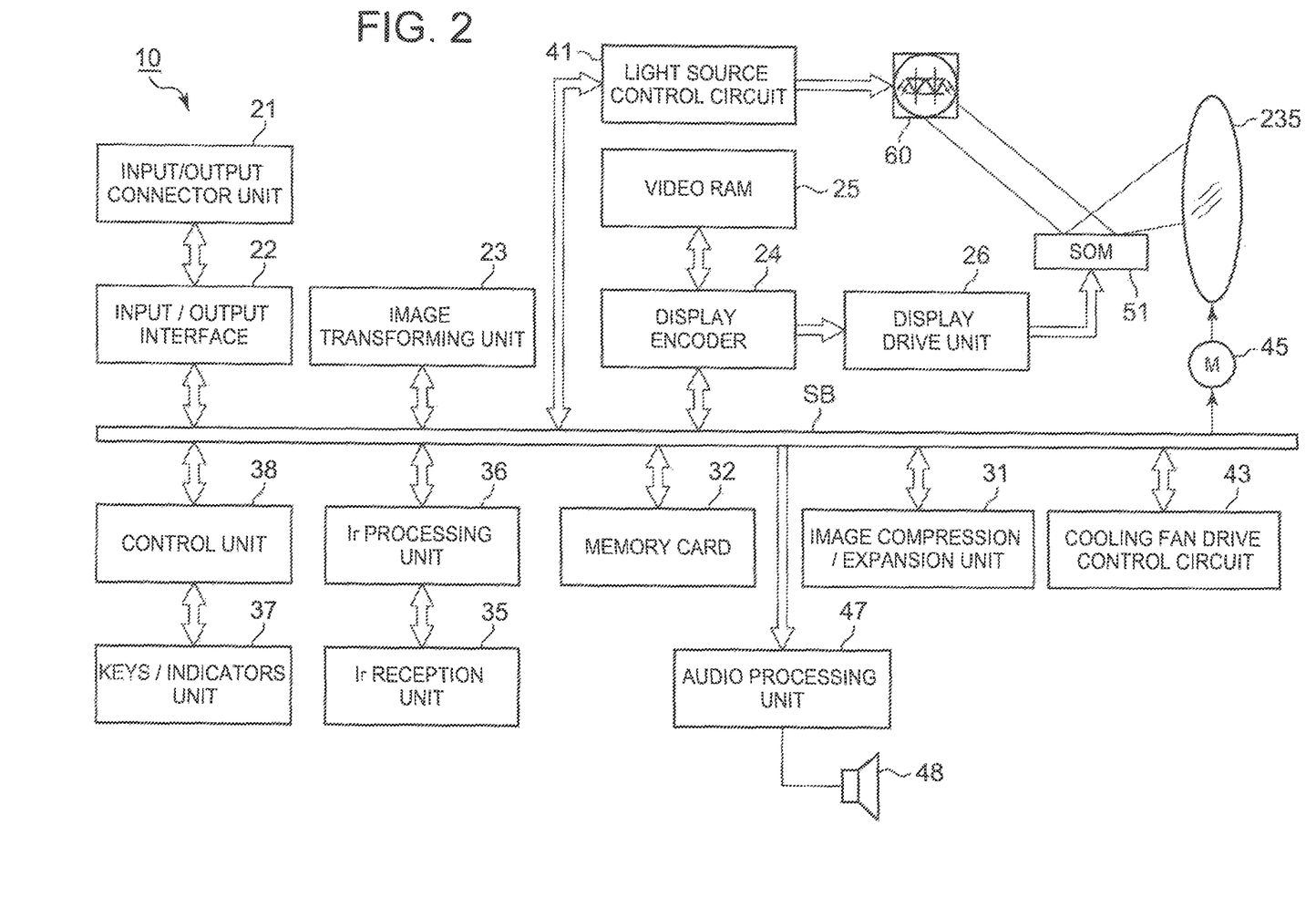
FIG. 2 is a functional block diagram of the projector according to the embodiment of the invention.

Next, a projector control unit of the projector 10 will be described by use of a functional block diagram shown in FIG. 2.

The projector control unit includes a control unit 38, an input/output interface 22, an image transforming unit 23, a display encoder 24, a display drive unit 26 and the like.

The control unit 38 governs the control of respective operations of circuitries within the projector 10 and includes a CPU, a ROM which stores in a fixed fashion operation programs of various types of settings and a RAM which is used as a working memory.

Then, image signals of various standards that are inputted from the input/output connector unit 21 are sent via the input/output interface 22 and a system bus (SB) to the image transforming unit 23 where the image signals are transformed so as to be unified into an image signal of a predetermined format which is suitable for display by the projector control unit. Thereafter, the image signals so transformed are outputted to the display encoder 24.

In addition, the display encoder 24 deploys the image signals that have been inputted thereinto on a video RAM 25 for storage therein and generates a video signal from the contents stored in the video RAM 25, outputting the video signal so generated to the display drive unit 26.

The display drive unit 26 functions as a display element control unit and drives a display element 51 which is a spatial optical modulator (SOM) at an appropriate frame rate in response to the image signal outputted from the display encoder 24.

Additionally, in this projector 10, a pencil of light that is emitted from a light source unit 60 is shone onto the display element 51 via a light source side optical system, which will be described later, to thereby form an optical image based on reflected light reflected by the display element 51. The image so formed is then projected on to a screen, not shown, for display thereon via a projection side optical system. In addition, a movable lens group 235 of this projection side optical system is driven by a lens motor 45 for zooming or focusing.

Additionally, an image compression/expansion unit 31 executes a recording process in which a luminance signal and a color difference signal of an image signal are data compressed through processes such as ADCT and Huffman coding, and the compressed data is sequentially written onto a memory card 32 which is configured as a detachable recording medium.

Further, when in a reproducing mode, the image compression/expansion unit 31 reads out the image data which is recorded on the memory card 32 and expands individual image data which make up a series of dynamic images frame by frame. Then, the image data is outputted to the display encoder 24 via the image transforming unit 23 so as to enable the display of dynamic images based on the image data stored on the memory card 32.

Operation signals generated at the keys/indicators unit 37 which includes the main keys, indicators and the like which are provided on the upper side panel 11 of the projector casing are sent out directly to the control unit 38. Key operation signals from the remote controller are received by the Ir reception unit 35, and a code signal which is demodulated at an Ir processing unit 36 is outputted to the control unit 38.

In addition, an audio processing unit 47 is connected to the control unit 38 via the system bus (SB). This audio processing unit 47 includes a circuitry for a sound source such as a PCM sound source. When in a projection mode and a reproducing mode, the audio processing unit 47 converts audio data into analog signals and drives a loudspeaker 48 to radiate loudly sound or voice based on the audio data.

In addition, the control unit 38 controls a light source control circuit 41 which is configured as a light source control unit. This light source control circuit 41 controls individually the emission of light of red wavelength band, light of green wavelength band and light of blue wavelength band from the light source unit 60 so that light of a predetermined wavelength band which is required when an image is generated is emitted from the light source unit 60.

Further, the control unit 38 causes a cooling fan drive control circuit 43 to detect temperatures through a plurality of temperature sensors which are provided in the light source unit 60 so as to control the rotating speeds of cooling fans based on the results of the temperature detection.

Additionally, the control unit 38 also causes the cooling fan drive control circuit 43 to make the cooling fans continue to rotate even after the power supply of a projector main body is switched off by use of a timer or the like. Alternatively, the control unit 38 causes the cooling fan drive control circuit 43 to make the power supply to the projector main body be cut off depending upon the results of the temperature detection by the temperature sensors.

Figure 3:
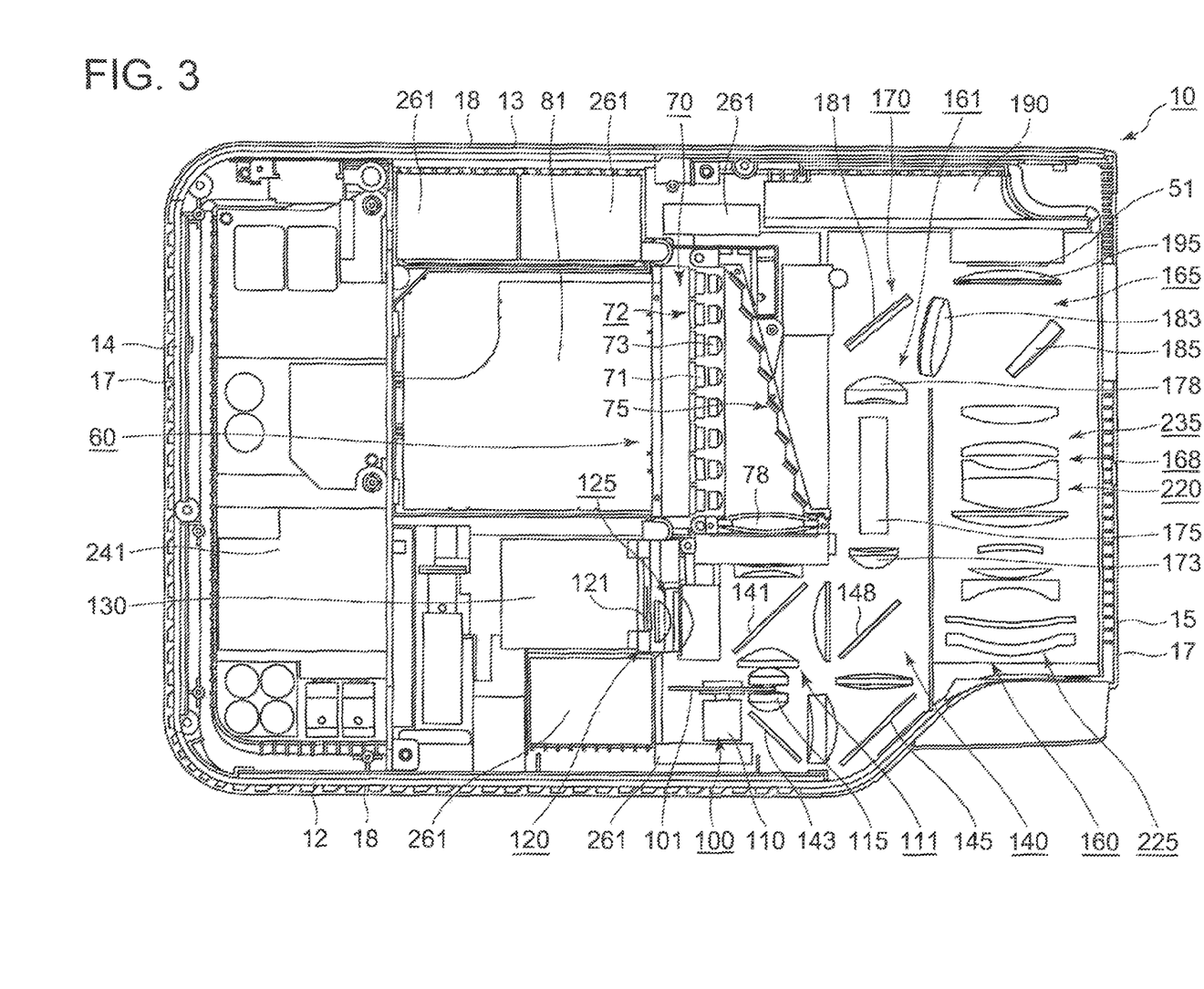
FIG. 3 is an exemplary plan view showing an internal construction of the projector according to the embodiment of the invention.

Next, an internal construction of the projector 10 will be described.

FIG. 3 is an exemplary plan view showing an internal construction of the projector 10.

As shown in FIG. 3, the projector 10 includes a control circuit board 241 in the vicinity of the right side panel 14. This control circuit board 241 includes a power supply circuit block, a light source control block and the like. Additionally, the projector 10 includes the light source unit 60 which is provided to a side of the control circuit board 241, that is, at a substantially central portion of the projector casing. Further, the projector 10 includes an optical system unit 160 between the light source unit 60 and the left side panel 15.

The light source unit 60 includes an excitation light shining device 70, a luminescent light emitting device 100, a red light source device 120 and a light guiding optical system 140. The excitation light shining device 70 is disposed at a substantially transversely central portion of the projector casing and in the vicinity of the back side panel 13. The luminescent light emitting device 100 is disposed on an optical axis of a pencil of light which is emitted from the excitation light shining device 70 and in the vicinity of the front side panel 12. The red light source device 120 is disposed between the excitation light shining device 70 and the luminescent light emitting device 100. The light guiding optical system 140 turns the directions of optical axes of light which is emitted from the luminescent light emitting device 100 and light which is emitted from the red light source device 120 so that the optical axes of the light emitted from the luminescent light emitting device 100 and the light emitted from the red light source device 120 are collected to the same optical axis so as to be guided to an entrance port of a light tunnel 175 which constitutes a predetermined plane.

The excitation light shining device 70 includes a light source group 72 which includes a plurality of excitation light sources 71 which are disposed so that optical axes thereof are parallel to the back side panel 13, a plurality of reflection mirrors 75 which each turn an optical axis of light emitted from each of the excitation light sources 71 of the light source group 72 by 90 degrees in the direction of the front side panel 12, a collective lens 78 which collects light emitted from the excitation light sources 71 and reflected by the plurality of reflection mirrors 75, and a heat sink 81 which is disposed between the excitation light sources 71 and the right side panel 14.

In the light source group 72, the excitation light sources 71 which are made up of a plurality of blue laser light emitters or emitting diodes are arranged into a matrix.

Specifically, the excitation light shining device 70 is made up of four light source devices which are aligned side by side. Each of the light source devices includes a plurality of or six blue laser diodes (six excitation light sources 71) which are semiconductor light emitting elements, and the six blue laser diodes or excitation light sources 71 are disposed into a matrix of two rows and three columns.

Additionally, six collimator lenses are formed integrally on a plate which constitutes a lens array 73, and this lens array 73 is disposed so that the collimator lenses are individually aligned with optical axes of the excitation light sources 71 so as to transform pencils of light emitted from the excitation light sources 71 into parallel beams of light to thereby enhance the directionality thereof.

In addition, the plurality of reflection mirrors 75 are arranged into steps like steps of a staircase. The reflection mirrors 75 then individually reflect pencils of light source light which are emitted from the excitation light sources 71 towards the collective lens 78 while narrowing spaces between the pencils of light source light so as to reduce the sectional area of a pencil of light that is emitted from the light source group 72 in a horizontal direction.

A plurality of cooling fans 261 are disposed between the heat sink 81 and the back side panel 13, and the excitation light sources 71 are cooled by the cooling fans 261 and the heat sink 81.

Further, a cooling fan 261 is also disposed between the reflecting mirrors 75 and the back side panel 13, and the reflecting mirrors 75 and the collective lens 78 are cooled by this cooling fan 261.

The luminescent light emitting device 100 includes a luminescent wheel 101 which is disposed so as to be parallel to the front side panel 12, that is, so as to be at right angle to an optical axis of light that is emitted from the excitation light shining device 70, a wheel motor 110 which rotationally drives the luminescent wheel 101, a collective lens group 111 which collects a pencil of light that is emitted from the excitation light shining device 70 to the luminescent wheel 101 and a pencil of light which is emitted from the luminescent wheel 101 in the direction of the backside panel 13, and a collective lens 115 which collects a pencil of light which is emitted from the luminescent wheel 101 in the direction of the front side panel 12.

A green luminescent light emitting area and a diffuse light transmission area are provided on the luminescent wheel 101 so as to be aligned end to end in a circumferential direction. The green luminescent light emitting area receives light emitted from the excitation light shining device 70 as excitation light to emit luminescent light of green wavelength band. The diffuse light transmission area transmits light that is emitted from the excitation light shining device 70 in a diffusing fashion.

In addition, a base of the green luminescent light emitting area is a metallic base that is formed of copper, aluminum or the like, and a surface of a side of the base which faces the back side panel 13 is mirror finished through silver deposition or the like, and a layer of green luminescent material is laid on this mirror-finished surface.

Further, a base of the diffuse light transmission area is a transparent base having light transmissivity, and minute irregularities are formed on a surface of the base through sandblasting or the like.

Then, light that is emitted from the excitation light shining device 70 and which is shone on to the green luminescent material layer on the luminescent wheel 101 excites the green luminescent material on the green luminescent material layer. Pencils of luminescent light which are emitted in every direction from the green luminescent material so excited are then directed directly towards the back side panel 13 or are reflected on a surface of the luminescent wheel 101 so as to be eventually directed towards the back side panel 13 to thereby be incident on the collective lens group 111.

In addition, light that is emitted from the excitation light shining device 70 and which is shone onto the diffuse light transmission area of the luminescent wheel 101 enters the collective lens 115 as diffuse transmission light that is diffused by the minute irregularities.

Additionally, a cooling fan 261 is disposed between the wheel motor 110 and the front side panel 12, whereby the luminescent light emitting device 100 is cooled by this cooling fan 261.

The red light source device 120 is a single color light emitting device and includes a red light source 121 and a collective lens group 125 which collects light which is emitted from the red light source 121. This red light source 121 is disposed so that an optical axis thereof becomes parallel to the optical axes of the excitation light sources 71.

The red light source 121 is a red light emitting diode which emits light of red wavelength band. This red light source device 120 is disposed so that the optical axis thereof intersects the axis of light emitted from the excitation light shining device 70 and the axis of luminescent light of green wavelength band which is emitted from the luminescent wheel 101.

Further, the red light source device 120 includes a heat sink 130 which is disposed on a side of the red light source 121 which faces the right side panel 14. Additionally, a cooling fan 261 is disposed between the heat sink 130 and the front side panel 12, and the red light source 121 is cooled by this cooling fan 261.

The light guiding optical system 140 includes collective lenses which collect pencils of light of red, green and blue wavelength bands, reflection mirrors and dichroic mirrors which turn the directions of optical axes of the pencils of light of red, green and blue wavelength bands to direct them to the same optical axis and the like.

Specifically speaking, in the light guiding optical system 140, a first dichroic mirror 141 is disposed in a position where the optical axes of light of blue wavelength band which is emitted from the excitation light shining device 70 and light of green wavelength band which is emitted from the luminescent wheel 101 intersect the optical axis of light of red wavelength band which is emitted from the red light source device 120. This first dichroic mirror 141 transmits light of blue wavelength band and light of red wavelength band and reflects light of green wavelength band to turn the direction of the optical axis of the green light by 90 degrees towards the left side panel 15.

In addition, a first reflection mirror 143 is disposed on the optical axis of light of blue wavelength band which has been transmitted through the luminescent wheel 101 while being diffused, that is, between the collective lens 115 and the front side panel 12. This first reflection mirror 143 reflects light of blue wavelength band and turns the optical axis of the blue light by 90 degrees in the direction of the left side panel 15.

Further, a second reflection mirror 145 is disposed on the optical axis of the light of blue wavelength band which is reflected on the first reflection mirror 143 and in the vicinity of the optical system unit 160, this second reflection mirror 145 turns the optical axis of the blue light by 90 degrees in the direction of the back side panel 13.

In addition, in the light guiding optical system 140, a second dichroic mirror 148 is disposed in a position where the optical axis of light of red wavelength band which has passed through the first dichroic mirror 141 and the optical axis of light of green wavelength band which is reflected by the first dichroic mirror 141 so that the optical axis thereof coincides with the optical axis of this red light intersect the optical axis of light of blue wavelength band which is reflected by the second reflection mirror 145, and this second dichroic mirror 148 transmits light of blue wavelength band and reflects light of green wavelength band and light of red wavelength band so that the directions of the optical axes of these red light and green light are turned by 90 degrees in the direction of the back side panel 13.

Additionally, collective lenses are disposed between the dichroic mirrors and the reflection mirrors, respectively. Further, a collective lens 173 is disposed in the vicinity of the light tunnel 175. This collective lens 173 collects light source light to the entrance port of the light tunnel 175.

The optical system unit 160 is configured into a substantially U-shape by three blocks such as an illumination side block 161 which is positioned to a left-hand side of the excitation light shining device 70, an image generating block 165 which is positioned in the vicinity of a position where the back side panel 13 intersects the left side panel 15, and a projection side block 168 which is positioned between the light guiding optical system 140 and the left side panel 15.

The illumination side block 161 includes part of a light source side optical system 170 which guides light source light which is emitted from the light source unit 60 to the display element 51 that is possessed by the image generating block 165.

The light source side optical system 170 that the illumination side block 161 possesses includes the light tunnel 175 which transforms a pencil of light which is emitted from the light source unit 60 into a pencil of light in which the intensity thereof is uniformly distributed, a collective lens 178 which collects light which is emitted from the light tunnel 175, and an optical axis turning mirror 181 which turns the direction of the optical axis of a pencil of light which is emitted from the light tunnel 175 in the direction of the image generating block 165.

The image generating block 165 has, as the light source side optical system 170, a collective lens 183 which collects the light source light which is reflected by the optical axis turning mirror 181 to the display element 51 and a shining mirror 185 which shines the pencil of light which has passed through the collective lens 183 to the display element 51 at a predetermined angle. Further, the image generating block 165 includes a DMD which is the display element 51.

A heat sink 190 is disposed between the display element 51 and the back side panel 13 for cooling the display element 51. Thus, the display element 51 is cooled by this heat sink 190. Additionally, a condenser lens 195, which is a projection side optical system 220, is disposed in the vicinity of the front of the display element 51.

The projection side block 168 has a group of lenses of the projection side optical system 220 which projects the "on" light which is reflected on the display element 51 on to the screen. This projection side optical system 220 includes a fixed lens group 225 which is incorporated in a fixed lens barrel and a movable lens group 235 which is incorporated in a movable lens barrel. These groups of lenses are configured into a variable focus lens having a zooming function, and the movable lens group 235 is moved by a lens motor for zooming and focusing.

Next, the configuration of the light source device of the invention will be described in detail by use of the drawings which has the lens array 73 and the excitation light sources 71 which are made up of the blue laser diodes.

Figure 4:
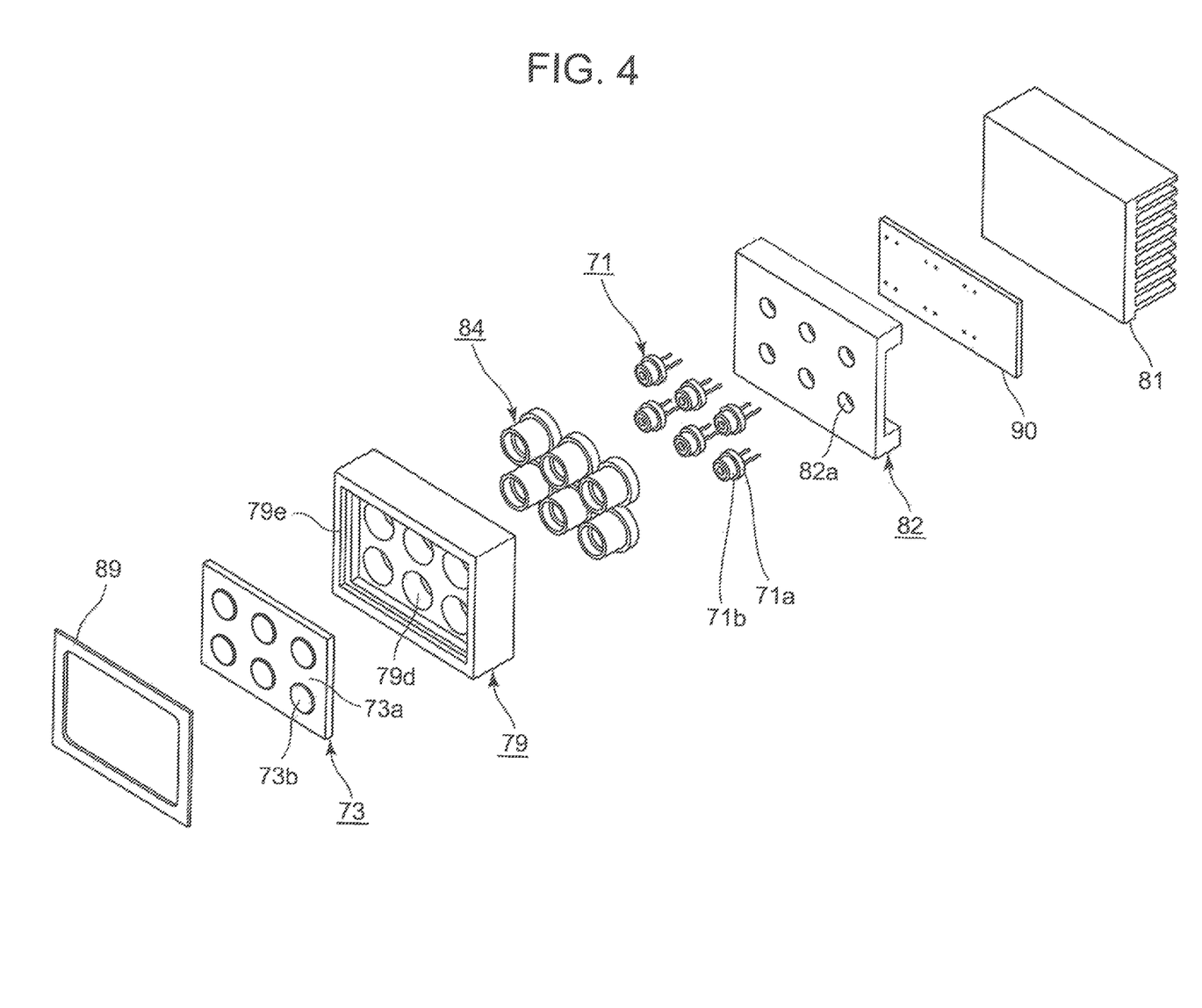
FIG. 4 is an exploded perspective view of a light source device of the projector according to the embodiment of the invention.
Figure 5:
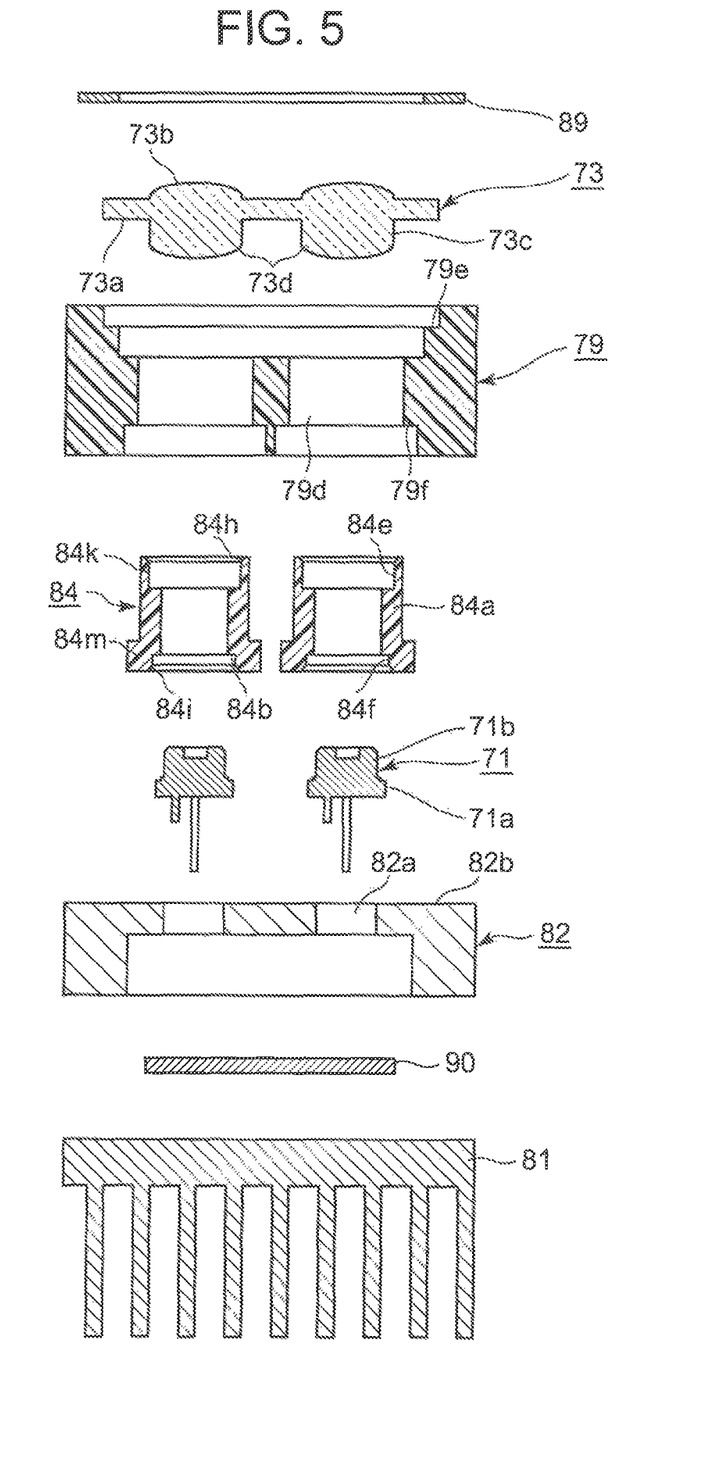
FIG. 5 is an exploded view of the light source device according to the embodiment of the invention.
Figure 6:
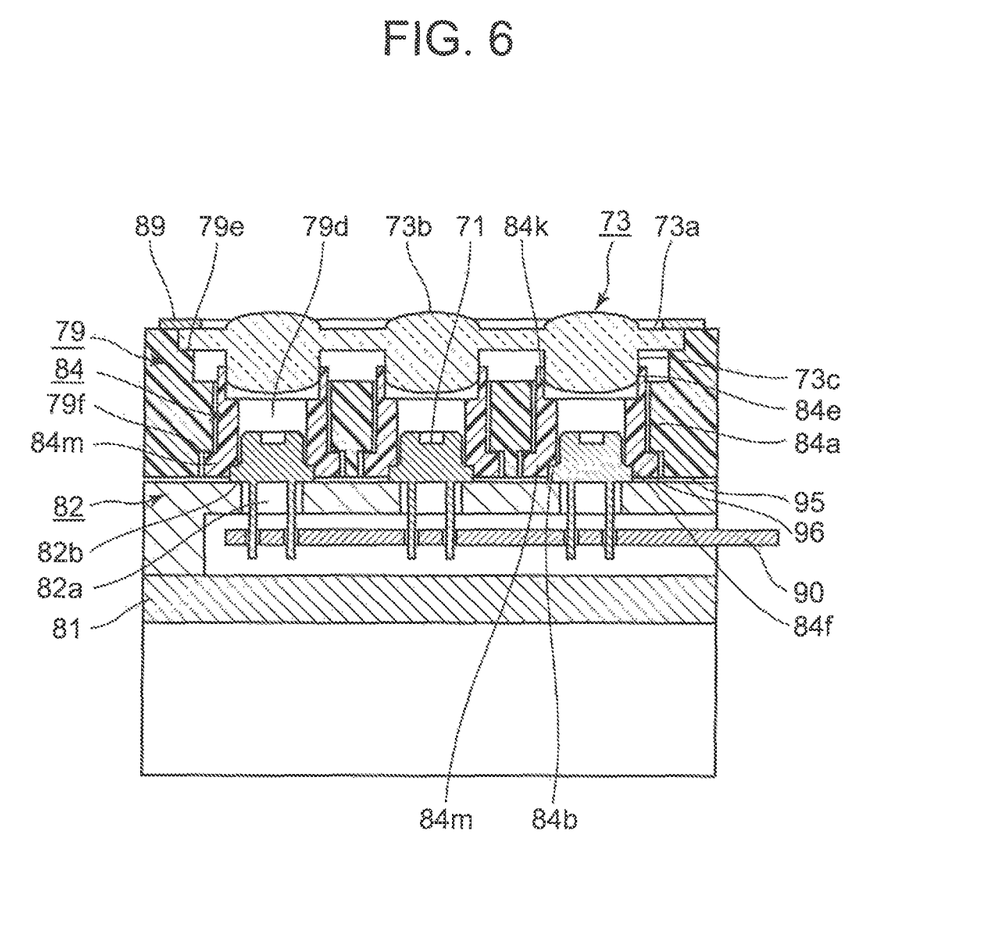
FIG. 6 is a sectional view of the light source device according to the embodiment of the invention.

FIG. 4 is an exploded perspective view of the light source device, FIG. 5 is an exploded view of the light source device, and FIG. 6 is a sectional view of the light source device.

When referred to with respect to the light source device of the invention in this embodiment, left and right denote, respectively, left and right directions with respect to the light emitting direction of the excitation light sources 71 shown in FIG. 4, and front and rear denote, respectively, front and rear directions with respect to the light emitting direction of the excitation light source devices 71.

As shown in FIG. 4, the light source device includes the excitation light sources 71, the lens array 73, cylindrical holders 84, a lens array holder 79, a rear holder 82, a flexible circuit board 90 and a fastening plate 89.

The excitation light sources 71 are made up of the blue laser diodes which are the light source elements which each have a cylindrical metallic flange portion 71a that has a cylindrical shape and which can dissipate heat and a cylindrical portion 71b having a cylindrical shape which is smaller in diameter than the flange portion 71a.

The lens array 73 is formed so that lens portions 73b are formed integrally on a plate-shaped base portion 73a, and it is disposed so that the lens portions 73b are individually aligned with the optical axes of the excitation light sources 71 so as to transform pencils of light emitted from the excitation light sources 71 into parallel beams of light to thereby enhance the directionality thereof.

The cylindrical holders 84 are each interposed between the excitation light sources 71 and the lens array 73 and they each incorporate in an interior thereof the lens portion 73b and the excitation light source 71 which pair up.

The lens array holder 79 has hole portions 79d and it holds the lens array 73 at the front thereof.

The rear holder 82 presses on the excitation light sources 71 from the rear thereof.

The flexible circuit board 90 is electrically connected to lead terminals of the excitation light sources 71.
And the fastening plate 89 holds the lens array 73 from the front thereof.

The lens array 73 has a substantially rectangular plate shape and is made of a glass material or the like having light transmission properties.

As shown in FIG. 4, a plurality of collimator lenses are formed integrally into the lens array 73 so as to be arranged to correspond individually to the plurality of excitation light sources 71. The collimator lenses each collect light emitted from the corresponding excitation light source 71 as parallel light. In the lens array 73, the base portion 73a and the lens portions 73b are formed integrally.

Optical glass such as crown glass having high transparency or fused quartz can be used as the glass material.

As shown in FIG. 5, the lens array 73 has the lens portions 73b which each have a biconvex shape which can transform light emitted from the excitation light source 71 into parallel light. A light entrance side and a light exit side of the lens portion 73b are formed into predetermined curved surfaces.

In the lens array 73, each of the lens portions 73b has on the light entrance side thereof a positioning straight cylindrical portion 73c which is parallel to the direction of an optical axis of the lens portion 73b.

In the lens array 73, a tapered surface 73d is formed along a distal circumferential edge of the positioning straight cylindrical portion 73c of the lens portion 73b.

In the lens array 73, the cylindrical portions 73c are formed so that center lines or axes of the cylindrical portions 73c are aligned with optical axes of the lens portions 73b.

The base portion 73a is a plate member having a substantially rectangular external shape.

In the base portion 73a, the multiplicity of lens portions 73b are formed so as to project in a curved fashion from a flat surface and are arranged into a matrix within a substantially rectangular area defined predetermined dimensions inwardly from respective outer edges of the substantially rectangular external shape of the lens array 73.

In the case of this embodiment, in total, six lens portions 73b are formed in two rows and three columns.

The lens array holder 79 is formed of a heat resistant hard resin material and has a flat plate shape. The lens array holder 79 has hole portions 79d which can accommodate therein the corresponding cylindrical holders 84.

Additionally, the lens array holder 79 has a lens bearing portion 79e which is provided at the front of the hole portions 79d for bearing a circumferential edge of the base portion 73a of the lens array 73.

Additionally, the lens array holder 79 has pressing portions 79f at the rear of the hole portions 79d which press on to fasten front surfaces of second cylindrical portions 84m, which will be described later, of the cylindrical holders 84.

The cylindrical holders 84 are each a hollow cylindrical annular member which is formed of a heat resistant zinc material or hard resin material and are disposed between the plurality of excitation light sources 71 and the lens array 73.

Additionally, the cylindrical holders 84 each have a cylindrical main body portion 84a having a circular cylindrical shape which lies at an axially central portion, a first cylindrical portion 84k having as an inner surface a first straight cylindrical surface 84e which fits on the cylindrical portion 73c of the lens array 73 and the second cylindrical portion 84m having as an inner surface a second straight cylindrical surface 84f which fits on part of an outer surface of the excitation light source 71.

In addition, as shown in FIG. 5, tapered surfaces 84h, 84i are formed at outer end portions of openings in the first cylindrical surface 84e and the second cylindrical surface 84f, respectively.

Additionally, the cylindrical holder 84 has a pressing portion 84b inside the second cylindrical surface 84f, and this pressing portion 84b constitutes a flange bearing surface which presses on to fasten a front surface of the flange portion 71a of the excitation light source 71.

As shown in FIG. 6, the cylindrical holder 84 is disposed so as to be closely attached to a circumferential side surface of the flange portion 71a of the excitation light source 71 at the cylindrical surface 84f thereof which fits on the circumferential side surface of the flange portion 71a of the excitation light source 71.

Additionally, as shown in FIG. 6, the cylindrical holder 84 is disposed so as to be closely attached to the cylindrical portion 73c of the lens portion 73b of the lens array 73 at the cylindrical surface 84e thereof which fits on the cylindrical portion 73c of the lens portion 73b of the lens array 73.

The rear holder 82 is a plate-shaped heat dissipating member which is formed of aluminum or the like. The rear holder 82 has an element bearing portion 82b which bears the flange portions 71a of the excitation light sources 71 at a front surface and hole portions 82a through which the lead terminals of the excitation light sources 71 are inserted.

Circumferential edges of rear surfaces of the flange portions 71a of the excitation light sources 71 are pressed against the element bearing portion 82b from the front thereof.

The heat sink 81 having a number of heat dissipating fins is joined to a rear surface of the rear holder 82.

The lead terminals of the excitation light sources 71 which are inserted through the hole portions 82a of the rear holder 82 are connected to the flexible circuit board 90 which corresponds to the control circuit board 241 on which the light source control circuit 41 is mounted at the rear of the rear holder 82.

In addition, the light source device includes the metallic fastening plate 89 which is a lens fastening member which fastens the lens array 73. This fastening plate 89 is formed into a thin plate which has a hole or opening portion at a portion where pencils of light emitted from the excitation light sources 71 pass.

The fastening plate 89 suppresses the movement of the lens array 73 in the direction of the optical axis thereof to thereby fix the lens array 73 in place in an ensured fashion.

Then, gaps 95 which are defined by the cylindrical holders 84 which are inserted into the hole portions 79d of the lens array holder 79 and the excitation light sources 71, and gaps 96 defined by the excitation light sources 71 are provided, as shown in FIG. 6, between confronting surfaces of the lens array holder 79 and the rear holder 82, and between confronting surfaces of the cylindrical holders 84 and the rear holder 82, respectively.

By providing the gaps 95 and the gaps 96, when the lens array holder 79, the cylindrical holders 84 and the rear holder 82 are integrated with each other, the front surfaces of the second cylindrical portions 84m of the cylindrical holders 84 are pressed against by the pressing portions 79f of the lens array holder 79, whereby the cylindrical holders 84 are positioned with respect to an optical axis direction.

Additionally, the front surfaces of the flange portions 71a of the excitation light sources 71 are pressed against by the pressing portions 84b that are provided at the rear ends of the cylindrical holders 84, whereby the excitation light sources 71 are positioned with respect to an optical axis direction, thereby making it possible to bring rear surfaces of the flange portions 71a of the excitation light sources 71 into strong press contact with the front surface of the rear holder 82.

Figure 8:
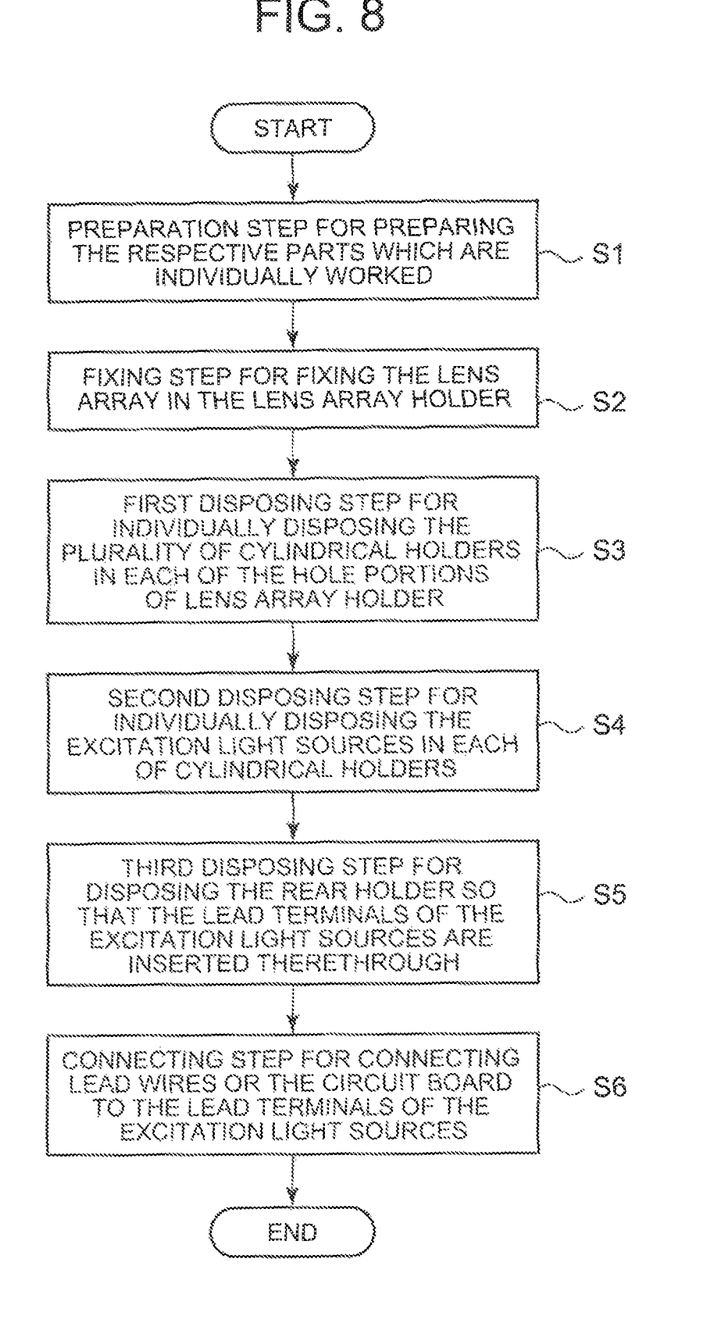
FIG. 8 is a flowchart illustrating a light source device fabrication method according to the embodiment of the invention.

Next, a flow of a fabrication method of the light source device of the invention will be described by use of FIG. 8.

As has been described above, the light source device has the plurality of excitation light sources 71, the lens array 73, the plurality of cylindrical holders 84, the lens array holder 79, the rear holder 82, the flexible circuit board 90 and the fastening plate 89.

The lens array 73 has the plurality of lens portions 73b which have on the light entrance side thereof the positioning cylindrical portions 73c which correspond to the plurality of excitation light sources 71.

The plurality of cylindrical holders 84 each have the first cylindrical portion 84k which has as the inner surface the first straight cylindrical surface 84e which fits on the cylindrical portion 73c and the second cylindrical portion 84m which has as the inner surface the second straight cylindrical surface 84f which fits on part of the outer surface of the excitation light source 71.

The lens array holder 79 has the hole portions 79d and it holds the lens array 73 at the front thereof. The rear holder 82 presses on the excitation light sources 71 from the rear thereof.

The flexible circuit board 90 is electrically connected with the lead terminals of the excitation light sources 71.

And the fastening plate 89 fastens the lens array 73 to the lens array holder 79.

In the fabrication method of the light source device that is configured as described above, firstly, a preparation step (process) is carried out in which the respective parts described above are individually worked for preparation (step S1).

Next, a fixing step (process) (step S2) is carried out. In this fixing step, the lens array 73 is disposed so that the outer circumferential edge of the base portion 73a is borne by the lens bearing portion 79e of the lens array holder 79, and the lens array 73 is fixed in an interior of the lens array holder 79 in such a way that the lens array 73 is sandwiched by the fastening plate 89 and the lens array holder 79.

Next, a first disposing step (process) (step S3) is carried out. In this first disposing step, the plurality of cylindrical holders 84 are disposed so as to be fitted in the hole portions 79d which penetrate the lens array holder 79 from the front surface to the rear surface thereof in such away that the first cylindrical surfaces 84e of the cylindrical holders 84 fit individually on the cylindrical portions 73c of the lens portions 73b.

It should be noted that since the tapered surfaces 73d are each formed on the lens portions 73b of the lens array 73 and the tapered surfaces 84h are each formed at the outer end portions of the openings of the first cylindrical surfaces 84e, the cylindrical holders 84 can easily be fitted on the lens array 73.

Following this, a second disposing step (process) (step S4) is carried out in which the flange portions 71a of the excitation light sources 71 are disposed so as to be fitted in the second cylindrical surfaces 84f of the plurality of cylindrical holders 84 which are disposed in the hole portions 79d of the lens array holder 79.

It should be noted that since the tapered surfaces 84i are formed at the outer end portions of the openings of the second cylindrical surfaces 84f of the cylindrical holders 84, the cylindrical holders 84 can easily be fitted on the excitation light sources 71.

Next, a third disposing step (process) (step S5) is carried out in which after the plurality of excitation light sources 71 have been disposed in the interiors of the plurality of cylindrical holders 84, the rear holder 82 is disposed so that the lead terminals of the excitation light sources 71 are inserted therethrough.

Then, a connecting step (process) (step S6) is carried out in which after the rear holder 82 has been disposed with the lead terminals of the plurality of excitation light sources 71 inserted therethrough, lead wires or the circuit board 90 is connected to the lead terminals of the excitation light sources 71.

Thus, since the fabrication method of the light source device includes the steps that have been described above, the optical axes of the excitation light sources 71 can be aligned with the optical axes of the lens portions 73b of the lens array 73 in an ensured fashion.

In the embodiment, the configuration of the excitation light shining device 70 which is the blue light source device is described as the light source device of the projector 10 which is formed by combining the light source elements with the lens array 73 which includes the plurality of lens portions 73b.

However, the light source device of the invention can equally be applied to the red light source device or the green light source device of the projector 10 in the event that the red light source device or the green light source device is configured so as to include an optical system that has a light source group in which a plurality of light sources are arranged in rows and columns in a planar fashion and a lens group that collects pencils of light which are emitted from the individual light sources.

Namely, the light source device of the invention can be used in the projector 10 as at least one of the red light source device 120, the green light source device and the blue light source device.

Additionally, in the embodiment, as the light source device of the projector 10, the configuration of the excitation light shining device 70 is described.

The excitation light shining device 70 includes 24 blue laser diodes by aligning side by side four light source devices each having six blue laser diodes or semiconductor light emitting elements which are arranged into the matrix of two rows and three columns and the lens array 73 having the lens portions which are arranged so as to correspond to the matrix of blue laser diodes.

Figure 7:
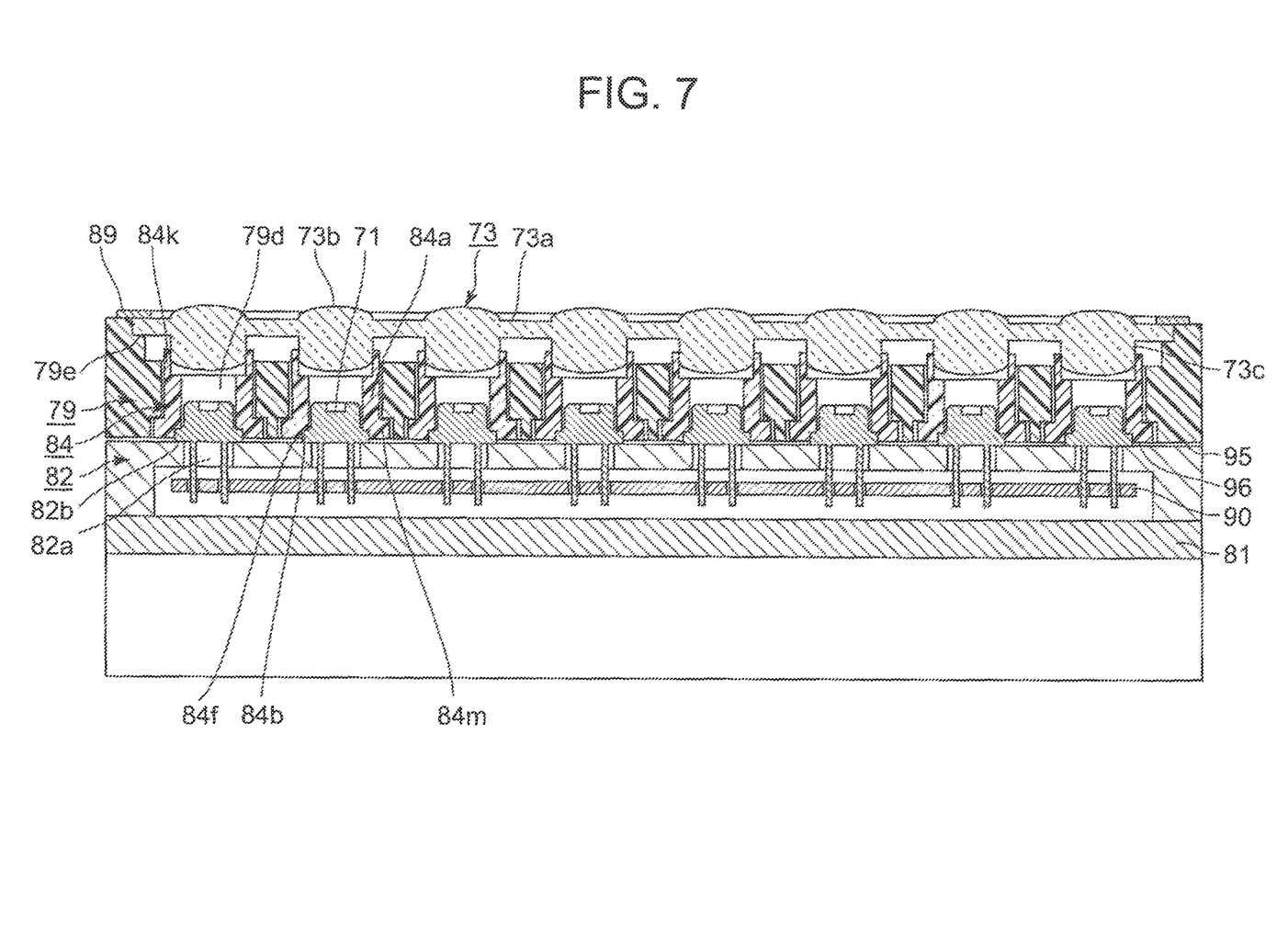
FIG. 7 is a sectional view of a light source device according to a modified example of a light source device according to the embodiment of the invention.

However, the light source device of the invention can also be applied to the configuration of a light source device having in total 24 laser diodes or light emitting elements which are arranged into a matrix of three rows and eight columns as a unit and a lens array 73 having lens portions which are arranged so as to correspond to the matrix of laser diodes as shown in FIG. 7.

Further, the lens array holder 79 shown in FIG. 4 includes six hole portions 79*d* which correspond to the lens portions 73*b* of the lens array 73.

However, the following configurations may be adopted. A hole portion 79*d* is configured so as to correspond to two lens portions 73*b*, and hence, three hole portions 79*d* are provided so that each hole portion 79*d* accommodates two cylindrical holders 84 and two light emitting elements. Alternatively, two hole portions 79*d* are provided so that each hole portion 79*d* accommodates three cylindrical holders 84 and three light emitting elements. Further, a lens array holder 79 is formed into a cylindrical shape which matches the perimeter of a lens array 73 so as to provide a single hole portion 79*d* which accommodates entirely six cylindrical holders and six light emitting elements, whereby all the cylindrical holders and light emitting elements are surround by the single hole portion 79*d*.

Thus, according to the embodiment that has been described heretofore, it is possible to provide the lens array 73 which facilitates the alignment of the optical axes of the light source elements and the optical axes of the lenses, the light source device that employs this lens array 73, the projector 10 that employs this light source device, and the fabrication method of the light source device.

Additionally, according to the embodiment, since the center lines or axes of the cylindrical portions 73*c* which are formed on the individual lens portions 73*b* of the lens array 73 are aligned with the optical axes of the individual lens portions 73*b*, the cylindrical holders 84 can be incorporated along the optical axes of the lens portions 73*b*, whereby the optical axes of the individual excitation light sources 71 can be aligned with the optical axes of the lens portions 73*b*.

Further, according to the embodiment of the invention, since the lens array 73 has the tapered surfaces 73*d* which are formed along the distal end circumferential edges of the cylindrical portions 73*c* of the individual lens portions 73*b*, the fitment of the lens array 73 and the cylindrical holders 84 can be facilitated.

Additionally, according to the embodiment of the invention, since the light source device includes the lens array 73, and the cylindrical holders 84 which each have the first cylindrical portion which fits on the cylindrical portion 73*c* of the lens portion 73*b* and the second cylindrical portion which fits on the excitation light source 71, the alignment of the optical axes of the excitation light sources 71 with the optical axes of the lens portions 73*b* can be facilitated.

Further, according to the embodiment of the invention, since the cylindrical holder 84 has the tapered surface 84*h*, 84*i* at the outer end portions of the openings of the first cylindrical surface 84*e* and the second cylindrical surface 84*f*, respectively, the fitment of the lens array 73 and the excitation light sources 71 can be facilitated.

In addition, according to the embodiment of the invention, since the light source device includes the lens array holder 79 that holds the lens array 73 at the front and which has the hole portions 79*d* which accommodate the cylindrical holders 84 which lie at the rear of the lens array 73, the lens array holder 79 functions as a protection wall which prevents dust from adhering to the lens array 73 and the excitation light sources 71 from the surroundings.

Further, according to the embodiment of the invention, since the light source device includes the fastening plate 89, the lens array 73 can be held in an ensured fashion.

In addition, according to the embodiment of the invention, since the light source device includes the rear holder 82 which presses on the plurality of excitation light sources 71 to the front, the excitation light sources 71 can be held in an ensured fashion.

Additionally, according to the embodiment of the invention, after the rear holder 82 has been disposed to correspond to the plurality of excitation light sources 71, lead wires or the circuit board is connected to the lead terminals of the excitation light sources 71.

By adopting this configuration, soldering work can be carried out in such a state that soldering positions of the circuit board and the like are fixed, and thereafter, due to the soldering positions being so fixed, the reliability in soldering can be ensured.

While the specific embodiment and its modified examples have been described heretofore, the embodiment and its modified examples are presented as the examples of the invention, and hence, there is no intention to limit the scope of the invention by them.

The novel embodiment and modified examples can be carried out in other various forms, and hence, various omissions, replacements and modifications can be made thereto without departing from the spirit and scope of the invention.

The embodiment and its modified examples are to be incorporated in the spirit and scope of the invention and are also incorporated in the scope of inventions described in claims and equivalents thereof.

What is claimed is:

1. A lens array comprising:
an assembly of a plurality of lenses which collect individually light emitted from a plurality of light source elements,
wherein each of the plurality of lenses includes, on a light exit side thereof, a lens portion and includes, on a light entrance side thereof, a cylindrical portion for positioning each of the plurality of lenses with respect to the plurality of light source elements, wherein the cylindrical portion is formed integrally with the lens portion, wherein each cylindrical portion is insertable in a lens holder which is adapted to hold the lens array at one end thereof and to hold the plurality of light source elements at another end thereof such that the plurality of lenses are positioned with respect to each of the plurality light source elements via insertion of the cylindrical portions in the lens holder.

2. A lens array as set forth in claim 1, wherein a center line of each of the cylindrical portions is aligned with an optical axis of the corresponding lens portion of each of the plurality of lenses.

3. A lens array as set forth in claim 1, wherein the plurality of lenses each have a tapered surface that is formed along a distal end circumferential edge of the cylindrical portion thereof.

4. A lens array as set forth in claim 1,
wherein the lens array further comprises a base portion which is formed integrally with the lens portions and the cylindrical portions, and
wherein the cylindrical portions project from the base portion toward the light entrance side.

5. A lens array as set forth in claim 4, wherein the cylindrical portions project toward a vertical of the optical axis of each of the plurality of lenses.

6. A light source device comprising:
a plurality of light source elements;
a lens array having a plurality of lenses which each include, on a light exit side thereof, a lens portion and, on a light entrance side thereof, a positioning cylindrical portion, wherein the positioning cylindrical portion is formed integrally with the lens portion, and wherein the positioning cylindrical portions of the plurality of lenses correspond respectively to the plurality of light source elements; and
a plurality of cylindrical holders (a) that are disposed between the plurality of light source elements and the lens array and (b) which each have a first cylindrical portion having as an inner surface thereof a first straight cylindrical surface which fits on the positioning cylindrical portion of a corresponding one of the plurality of lenses and a second cylindrical portion having as an inner surface thereof a second straight cylindrical surface which fits directly on part of an outer circumferential side surface of a corresponding one of the plurality of light source elements.

7. A light source device as set forth in claim 6, wherein the lens array has a tapered surface that is formed along a distal end circumferential edge of the cylindrical portion of each of the plurality of lenses.

8. A light source device as set forth in claim 6, wherein each of the cylindrical holders has a tapered surface or tapered surfaces at an outer end portion of an opening of at least one of the first cylindrical surface and/or the second cylindrical surface.

9. A light source device as set forth in claim 6, further comprising:
a lens array holder (a) that holds the lens array at a front thereof and (b) which includes hole portions which accommodate the cylindrical holders which are arranged at a rear end of the lens array.

10. A light source device as set forth in claim 9, further comprising:
a fastening plate which fastens the lens array to the lens array holder.

11. A light source device as set forth in claim 9,
wherein an outside diameter of the second cylindrical portion is larger than an outside diameter of the first cylindrical portion of each of the cylindrical holders,
wherein the lens array holder has at a rear end thereof pressing portions which fasten front surfaces of the second cylindrical portions, and
wherein the pressing portions press on the cylindrical holders so as to bring the cylindrical holders in abutment with the light source elements.

12. A light source device as set forth in claim 6, further comprising:
a rear holder which presses the plurality of light source elements to frontward.

13. A light source device as set forth in claim 12,
wherein each light source element has a flange portion at a rear end of a main body portion thereof,
wherein each cylindrical holder has a pressing portion which fastens a front surface of the flange portion of a corresponding one of the light source elements at a rear end thereof, and
wherein the pressing portion presses the corresponding light source element so as to bring the light source element into abutment with the rear holder.

14. A light source device as set forth in claim 12, wherein a gap is defined between a rear end face of each cylindrical holder and a front surface of the rear holder.

15. A light source device as set forth in claim 12, wherein a gap is defined between a rear end face of the lens array holder and the front surface of the rear holder.

16. A projector comprising:
the light source device set forth in claim 6;
a display element;
a light source side optical system for guiding light from the light source device to the display element;
a projection side optical system for projecting an image emitted from the display element on to a screen; and
a projector control unit for controlling the light source device and the display element.

17. A light source device fabrication method comprising:
a preparation process of preparing:
a plurality of light source elements;
a lens array having a plurality of lenses which include positioning cylindrical portions which correspond to the plurality of light source elements on a light entrance side thereof;
a plurality of cylindrical holders (a) that are disposed between the plurality of light source elements and the lens array and (b) which each have a first cylindrical portion having as an inner surface thereof a first straight cylindrical surface which fits on the cylindrical portion of a corresponding one of the plurality of lenses and a second cylindrical portion having as an inner surface thereof a second straight cylindrical surface which fits on part of an outer circumferential side surface of a corresponding one of the light source elements;
a lens array holder that has hole portions and which holds the lens array at a front end thereof;
a rear holder which presses the light source elements from rear ends thereof; and
a fastening plate which fastens the lens array to the lens array holder;
a fixing process of disposing the lens array holder outwards of a circumferential edge of the lens array and fixing the lens array to the lens array holder by the fastening plate;

a first disposing process of disposing the plurality of cylindrical holders in the hole portions of the lens array holder and disposing the cylindrical holders on the cylindrical portions of the lens array;

a second disposing process of disposing the plurality of light source elements individually in the plurality of cylindrical holders so disposed; and a third disposing process of disposing the rear holder so that lead terminals of the light source elements are inserted through the rear holder after the plurality of light source elements have been disposed in the plurality of cylindrical holders.

18. A light source device fabrication method as set forth in claim 17, further comprising:

a connecting process of connecting lead wires or a circuit board with the lead terminals of the light source elements after the rear holder has been disposed so as to correspond to the plurality of light source elements.

19. A light source device comprising:

a plurality of light source elements;

a lens array having a plurality of lenses which include positioning cylindrical portions which correspond respectively to the plurality of light source elements on a light entrance side thereof;

a plurality of cylindrical holders (a) that are disposed between the plurality of light source elements and the lens array and (b) which each have a first cylindrical portion having as an inner surface thereof a first straight cylindrical surface which fits on the positioning cylindrical portion of a corresponding one of the plurality of lenses and a second cylindrical portion having as an inner surface thereof a second straight cylindrical surface which fits on part of an outer circumferential side surface of a corresponding one of the plurality of light source elements;

a lens array holder (a) that holds the lens array at a front thereof and (b) which includes hole portions which accommodate the cylindrical holders which are arranged at a rear end of the lens array;

wherein an outside diameter of the second cylindrical portion is larger than an outside diameter of the first cylindrical portion of each of the cylindrical holders;

wherein the lens array holder has at a rear end thereof pressing portions which fasten front surfaces of the second cylindrical portions; and wherein the pressing portions press on the cylindrical holders so as to bring the cylindrical holders in abutment with the light source elements.

* * * * *